(12) United States Patent
Qu et al.

(10) Patent No.: US 8,666,358 B2
(45) Date of Patent: Mar. 4, 2014

(54) METHOD AND APPARATUS FOR DELIVERING AND RECEIVING ENHANCED EMERGENCY BROADCAST ALERT MESSAGES

(75) Inventors: Carl Qu, San Diego, CA (US); Ravindra M. Patwardhan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 152 days.

(21) Appl. No.: 12/406,002

(22) Filed: Mar. 17, 2009

(65) Prior Publication Data

US 2010/0124898 A1  May 20, 2010

Related U.S. Application Data

(60) Provisional application No. 61/115,832, filed on Nov. 18, 2008.

(51) Int. Cl.
| | |
|---|---|
| H04M 11/04 | (2006.01) |
| H04M 1/66 | (2006.01) |
| H04M 1/68 | (2006.01) |
| H04M 3/16 | (2006.01) |
| H04W 4/00 | (2009.01) |
| H04W 24/00 | (2009.01) |
| H04N 7/10 | (2006.01) |
| H04N 7/025 | (2006.01) |
| B60R 25/10 | (2013.01) |
| H04L 29/06 | (2006.01) |

(52) U.S. Cl.
USPC ............ 455/404.1; 455/466; 455/404.2; 455/456.1; 455/456.2; 455/457; 455/410; 455/432.2; 455/414.3; 455/426.1; 725/33; 340/426.2

(58) Field of Classification Search
USPC ........ 455/404.1, 404.2, 410, 412–414, 426.1, 455/435.3, 440, 441, 456.1, 456.2, 457, 455/458, 515, 521, 567; 342/357.1, 357.03, 342/357.07, 457, 357.06, 357.09, 357.08, 342/357.13; 340/426.19, 426.2, 426.28, 340/531; 701/213, 301

See application file for complete search history.

(56) References Cited

U.S. PATENT DOCUMENTS

| | | | |
|---|---|---|---|
| 7,058,385 B2 | 6/2006 | Lauper | |
| 2002/0160745 A1* | 10/2002 | Wang | 455/404 |

(Continued)

FOREIGN PATENT DOCUMENTS

| | | |
|---|---|---|
| CN | 101238739 A | 8/2008 |
| CN | 101398837 A | 4/2009 |

(Continued)

OTHER PUBLICATIONS

Common Alerting Protocol, V1.1 Oasis Standard CAP-V1.1, Oct. 2005 Editors: Elysa Jones, Art Botterell.*

(Continued)

*Primary Examiner* — Dwayne Bost
*Assistant Examiner* — Nalini Mummalaneni
(74) *Attorney, Agent, or Firm* — Abdollah Katbab

(57) ABSTRACT

Techniques for delivering and receiving emergency broadcast alert messages using Short Message Service (SMS) are described, In one design, a broadcast alert message for an emergency alert may be sent in an SMS broadcast message, e.g., by mapping at least one field of the broadcast alert message to corresponding Held(s) of the SMS broadcast message and mapping remaining Fields of the broadcast alert message to a data Field of the SMS broadcast message. The SMS broadcast message may include a website URI link, broadcast reception information, location information for an emergency event, etc. The SMS broadcast message may be carried in a system broadcast message sent to wireless devices. A wireless device may receive the system broadcast message, extract the SMS broadcast message, and obtain the broadcast alert message. The wireless device may detect for duplicate broadcast messages based on a hash digest generated for each broadcast message.

31 Claims, 7 Drawing Sheets

(56) References Cited

U.S. PATENT DOCUMENTS

| | | |
|---|---|---|
| 2003/0005306 A1 | 1/2003 | Hunt et al. |
| 2003/0055903 A1 | 3/2003 | Freed |
| 2003/0125076 A1* | 7/2003 | Seppala et al. ............. 455/556 |
| 2003/0143974 A1 | 7/2003 | Navarro |
| 2004/0030886 A1 | 2/2004 | Hinkson |
| 2004/0076126 A1* | 4/2004 | Qu et al. ................. 370/320 |
| 2004/0082346 A1* | 4/2004 | Skytt et al. ............ 455/456.3 |
| 2004/0103158 A1 | 5/2004 | Vella et al. |
| 2004/0203562 A1* | 10/2004 | Kolsrud ................. 455/404.1 |
| 2005/0176445 A1* | 8/2005 | Qu et al. ................. 455/458 |
| 2006/0020714 A1 | 1/2006 | Girouard et al. |
| 2007/0265024 A1 | 11/2007 | Vincent |
| 2008/0020702 A1* | 1/2008 | Jendbro et al. ........... 455/3.01 |
| 2008/0194224 A1 | 8/2008 | Thorson et al. |
| 2009/0233575 A1 | 9/2009 | Morrison |
| 2009/0291630 A1* | 11/2009 | Dunn et al. ............. 455/3.01 |
| 2010/0279646 A1 | 11/2010 | Thiebaut et al. |

FOREIGN PATENT DOCUMENTS

| | | |
|---|---|---|
| EP | 1753251 A1 | 2/2007 |
| GB | 2415574 A | 12/2005 |
| JP | 2006504330 A | 2/2006 |
| JP | 2008306527 A | 12/2008 |
| WO | WO0219069 A2 | 3/2002 |
| WO | WO2004012470 | 2/2004 |

OTHER PUBLICATIONS

First Report and Order in the Matter of the Commercial Mobile Alert System: Before the Federal Communications Commission Washington, D.C. 20554 Published: Apr. 9, 2008.*

3GPP2 C.S0015-A, Version 1.0, Jan. 11, 2002 Title: "Short Message Service (SMS) for Wideband Spread Spectrum Systems".*

3GPP2 C.R1001-C version 1.0 published Jan. 11, 2002 Title: "Administration of Parameter Value Assignments for cdma2000 Spread Spectrum Standards Release C".*

TIA-1149-0 CMASoverCDMA (500-08082902A; Published Oct. 29, 2008).*

International Search Report and Written Opinion—PCT/US2009/065003, International Search Authority—European Patent Office—Jun. 7, 2010.

TIA-1149-0, pp. 1-1-6-2, 2008. URL, ftp://ftp.3gpp2.org/TSGC/Working/2008/2008-10-Seoul/TR45.5-2008-10-Seoul/Plenary/CMAS/500-08082902_TIA-1149-0_CMASoverCDMA_PBV.pdf, Published Oct. 29, 2013.

* cited by examiner

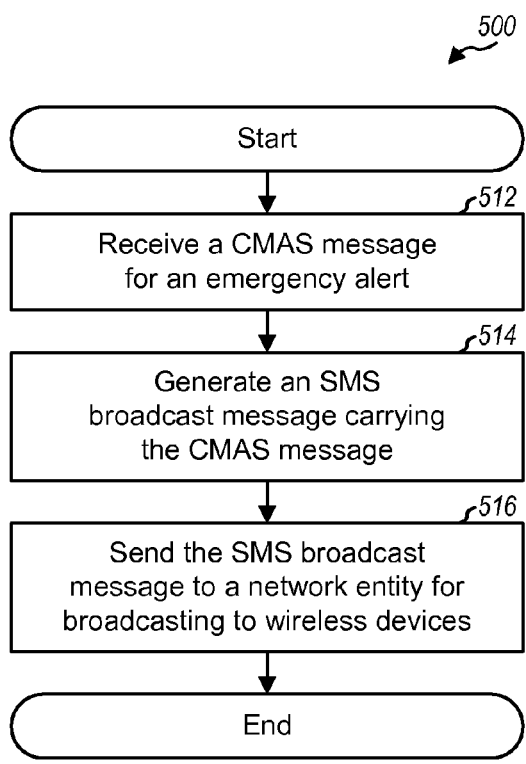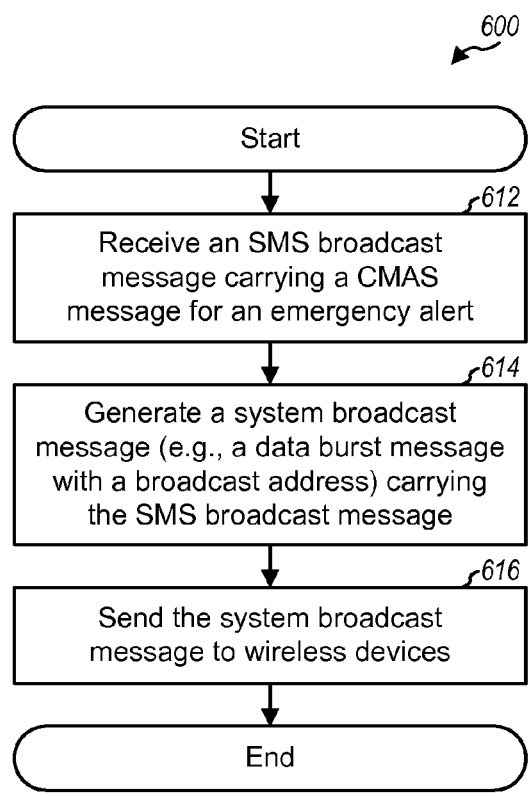
FIG. 5
FIG. 6

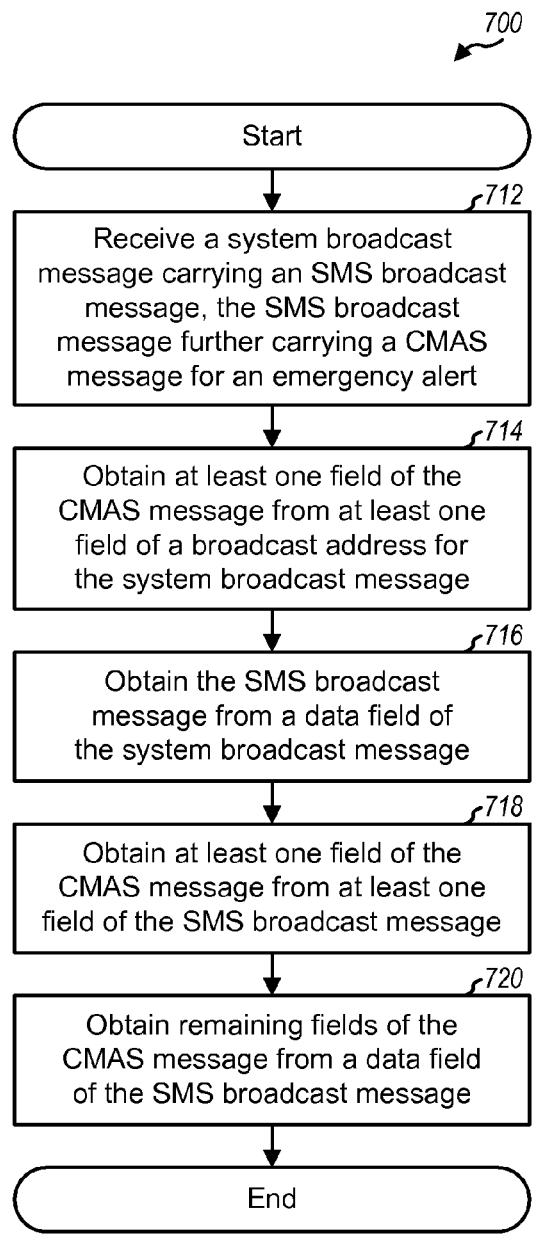
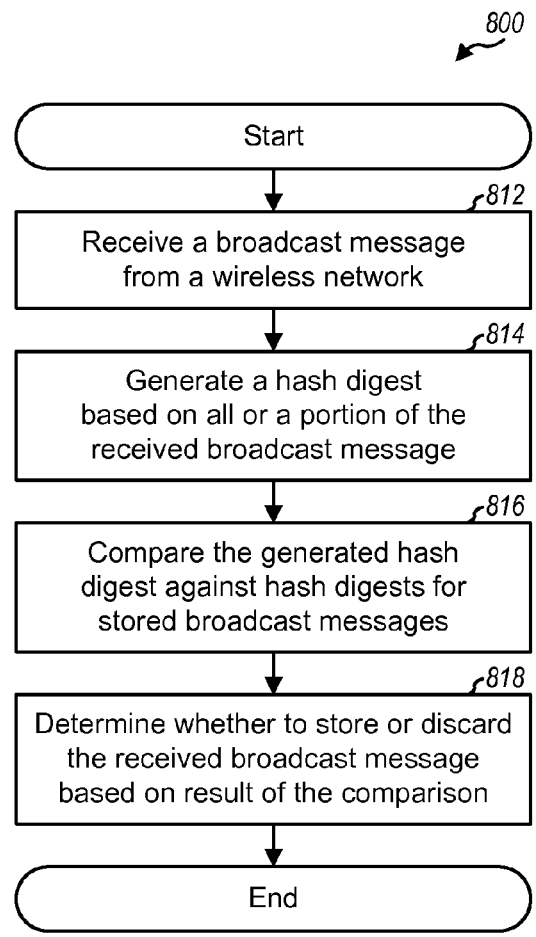
FIG. 7
FIG. 8

METHOD AND APPARATUS FOR DELIVERING AND RECEIVING ENHANCED EMERGENCY BROADCAST ALERT MESSAGES

I. CLAIM OF PRIORITY UNDER 35 U.S.C. §119

The present application for patent claims priority to Provisional U.S. Application Ser. No. 61/115,832, entitled "Methods and Apparatus for Using CDMA SMS for CMAS With Interactions of LBS, Mobile TV and Browser," filed Nov. 18, 2008, assigned to the assignee hereof, and expressly incorporated herein by reference.

BACKGROUND

I. Field

The present disclosure relates generally to communication, and more specifically to techniques for delivering broadcast messages to wireless devices and for receiving the messages at the wireless devices.

II. Background

A wireless device such as a cellular phone may support two-way communication with a wireless communication network. The wireless device may also be able to receive one-way broadcast messages of various types from the wireless network. These broadcast messages may include system messages, paging messages, text messages, broadcast alert messages, etc. A broadcast alert message is a message sent in a broadcast fashion to alert users of an event of possible interest to the users, which is in contrast to unicast messages sent to individual users. For example, a broadcast alert message may be for an emergency alert and may inform a user of a pending emergency event such as a hurricane, a fire, etc. It may be desirable to efficiently send and receive broadcast alert messages.

SUMMARY

Techniques for delivering and receiving broadcast alert messages using Short Message Service (SMS) are described herein. The techniques may be applicable for various broadcast alert services such as Commercial Mobile Alert Service (CMAS). CMAS is mandated by the Federal Communications Commission (FCC) to deliver various types of emergency broadcast alerts to wireless devices. The techniques may be used for various broadcast alert messages, such as those generated in accordance with CMAS and referred to as CMAS messages.

In one design, an SMS message center may receive a CMAS message (or some other broadcast alert message) for an emergency alert and may generate an SMS broadcast message carrying the CMAS message. The SMS message center may map at least one field of the CMAS message to at least one field of the SMS broadcast message and may map remaining fields of the CMAS message to a data field of the SMS broadcast message, as described below. The SMS broadcast message may also include (i) a Uniform Resource Identifier (URI) link for a website providing information for the emergency alert, (ii) broadcast reception information used to receive a broadcast channel providing information for the emergency alert, (iii) location information (e.g., latitude, longitude, altitude, radius, direction, speed, etc.) for an emergency event resulting in the emergency alert, and/or (iv) other information.

In one design, a base station may receive an SMS broadcast message carrying a CMAS message for an emergency alert and may generate a system broadcast message (e.g., a data burst message) carrying the SMS broadcast message. The base station may map at least one field of the CMAS message to at least one field of a broadcast address for the system broadcast message and may map the SMS broadcast message to a data field of the system broadcast message. A broadcast address may comprise information used by wireless devices to determine whether or not to receive a broadcast message. The base station may broadcast the system broadcast message to wireless devices within its coverage.

In one design, a wireless device may receive a system broadcast message carrying an SMS broadcast message, which may further carry a CMAS message for an emergency alert. The wireless device may obtain at least one field of the CMAS message from at least one field of a broadcast address for the system broadcast message. The wireless device may obtain the SMS broadcast message from a data field of the system broadcast message. The wireless device may also obtain at least one field of the CMAS message from at least one field of the SMS broadcast message and may obtain remaining fields of the CMAS message from a data field of the SMS broadcast message. The wireless device may also obtain a URI link, broadcast reception information, location information for an emergency event, and/or other information from the SMS broadcast message.

In another design, a wireless device may detect for duplicate broadcast messages. The wireless device may receive a broadcast message (e.g., a CMAS message, an SMS broadcast message, or a system broadcast message) from a wireless network. The wireless device may generate a hash digest based on all or a portion of the received broadcast message. The wireless device may compare the generated hash digest against hash digests for stored broadcast messages to determine whether to store or discard the received broadcast message. The wireless device may store the received broadcast message if the generated hash digest does not match any of the hash digests for the stored broadcast messages and may discard the received broadcast message otherwise.

Various aspects and features of the disclosure are described in further detail below.

BRIEF DESCRIPTION OF THE DRAWINGS

FIG. 5 shows a process performed by an SMS message center for delivering CMAS messages via SMS messages.

FIG. 6 shows a process performed by a base station for delivering SMS messages carrying CMAS messages.

FIG. 7 shows a process performed by a wireless device for receiving SMS messages carrying CMAS messages.

FIG. 8 shows a process performed by the wireless device for detecting for duplicate broadcast messages.

DETAILED DESCRIPTION

The word "exemplary" is used herein to mean "serving as an example, instance, or illustration." Any design described herein as "exemplary" is not necessarily to be construed as preferred or advantageous over other designs.

Figure 1:
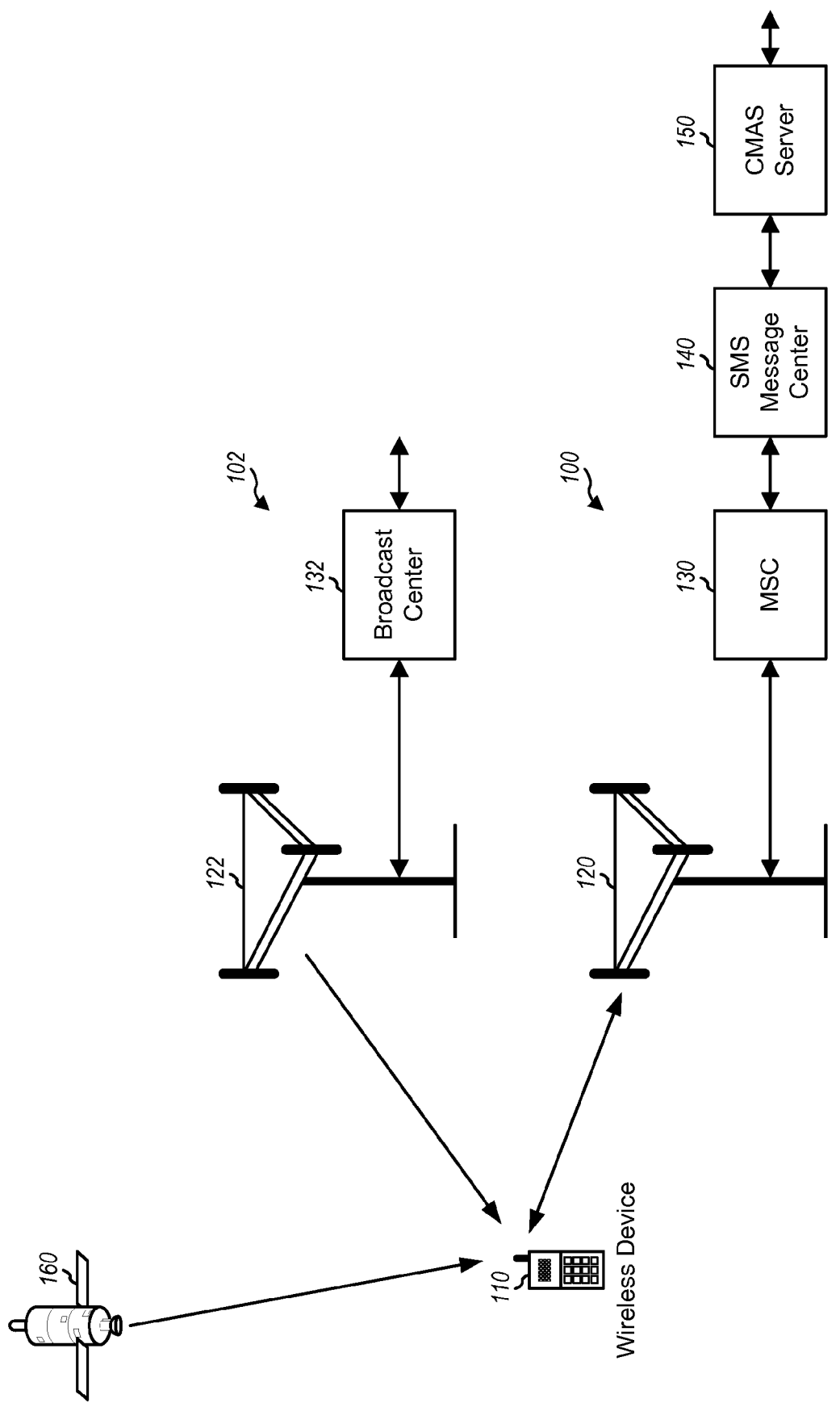
FIG. 1 shows a wireless communication network.

FIG. 1 shows a wireless communication network 100 that supports delivery of broadcast alert messages (e.g., CMAS messages) via SMS. The terms "network" and "system" are often used interchangeably. Wireless network 100 may include a number of base stations and other network entities. For simplicity, only one base station 120 and one mobile switching center (MSC) 130 are shown in FIG. 1. A base station may be a station that communicates with wireless devices and may also be referred to as a Node B, an evolved Node B (eNB), an access point, etc. MSC 130 may perform switching functions (e.g., routing of messages and data) for wireless devices within its coverage area. MSC 130 may couple to a set of base stations and control the communication for the wireless devices under the coverage of these base stations. Wireless network 100 may also include other network entities not shown in FIG. 1 for simplicity.

Wireless network 100 may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as cdma2000, Universal Terrestrial Radio Access (UTRA), etc. cdma2000 covers IS-2000, IS-95 and IS-856 standards. UTRA includes Wideband CDMA (WCDMA) and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.11 (Wi-Fi), Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

An SMS message center 140 may support SMS services for wireless devices. SMS message center 140 may be responsible for generating, storing, relaying, and forwarding SMS messages for wireless devices. SMS message center 140 may be an ANSI-41 message center in an ANSI-41 network, a GSM cell broadcast center (CBC) in a GSM Mobile Application Part (GSM-MAP) network, etc. ANSI-41 and GSM-MAP are mobile networking protocols that allow for roaming and advanced services, with ANSI-41 being commonly used for 3GPP2 networks and GSM-MAP being used for 3GPP networks. SMS is network technology dependent, and two SMS implementations have been defined for ANSI-41 and GSM-MAP. For simplicity, the SMS implementation for ANSI-41 is referred to herein as CDMA SMS, and the SMS implementation for GSM-MAP is referred to as GSM SMS.

A CMAS server 150 may generate and/or forward CMAS messages for emergency alerts and other scenarios. CMAS server 150 may also be referred to as an alert gateway, etc. CMAS server 150 may send the CMAS messages to SMS message center 140, which may generate SMS messages for the CMAS messages and then forward the SMS messages to MSC 130 for broadcast to wireless devices. CMAS server 150, SMS message center 140, and MSC 130 may communicate directly with one another (as shown in FIG. 1) or indirectly via other networks and/or network entities (not shown in FIG. 1).

A broadcast network 102 may include a number of broadcast stations and other network entities. For simplicity, only one broadcast station 122 and one broadcast center 132 are shown in FIG. 1. Broadcast station 122 may broadcast various types of information that may be of interest to users of wireless devices. Broadcast center 132 may receive information/content from content providers and may generate streams of data for broadcast station 122. For example, broadcast center 132 may provide a stream of data for each broadcast channel, and broadcast station 122 may transmit the data streams for all broadcast channels. Each broadcast channel may carry voice, video, text, and/or other information. For example, a broadcast channel may be for a television channel, an audio broadcast channel, etc. Broadcast network 102 may implement a radio technology such as MediaFLO™, Digital Video Broadcasting for Handhelds (DVB-H), Integrated Services Digital Broadcasting for Terrestrial Television Broadcasting (ISDB-T), etc.

A wireless device 110 may communicate with base station 120 in wireless network 100 for various services such as voice, video, data, SMS, etc. Wireless device 110 may also receive broadcast transmissions from broadcast station 122 in broadcast network 102 for various services such as SMS, broadcast, etc. Wireless device 110 may be stationary or mobile and may also be referred to as a mobile station (MS), a user equipment (UE), an access terminal (AT), a subscriber unit, a station, etc. Wireless device 110 may be a cellular phone, a personal digital assistant (PDA), a wireless communication device, a wireless modem, a handheld device, a mobile device, a handset, a laptop computer, a personal computer (PC), a broadcast receiver, etc.

Wireless device 110 may also receive signals from satellites 160, which may be part of the United States Global Positioning System (GPS), the European Galileo system, the Russian GLONASS system, or some other Global Navigation Satellite System (GNSS). Wireless device 110 may measure signals from satellites 160 and obtain pseudo-range measurements for the satellites. Wireless device 110 may also measure signals from base stations and/or broadcast stations and obtain timing measurements for these stations. The pseudo-range measurements and/or the timing measurements may be used to derive a location estimate for wireless device 110. A location estimate may also be referred to as a position estimate, a position fix, etc.

In general, broadcast alert messages may be generated for various scenarios and may include various types of information, which may be dependent on the scenarios for which the broadcast alert messages are generated. The broadcast alert messages may also be sent using various message formats. For clarity, much of the description below is for CMAS messages.

Figure 2:
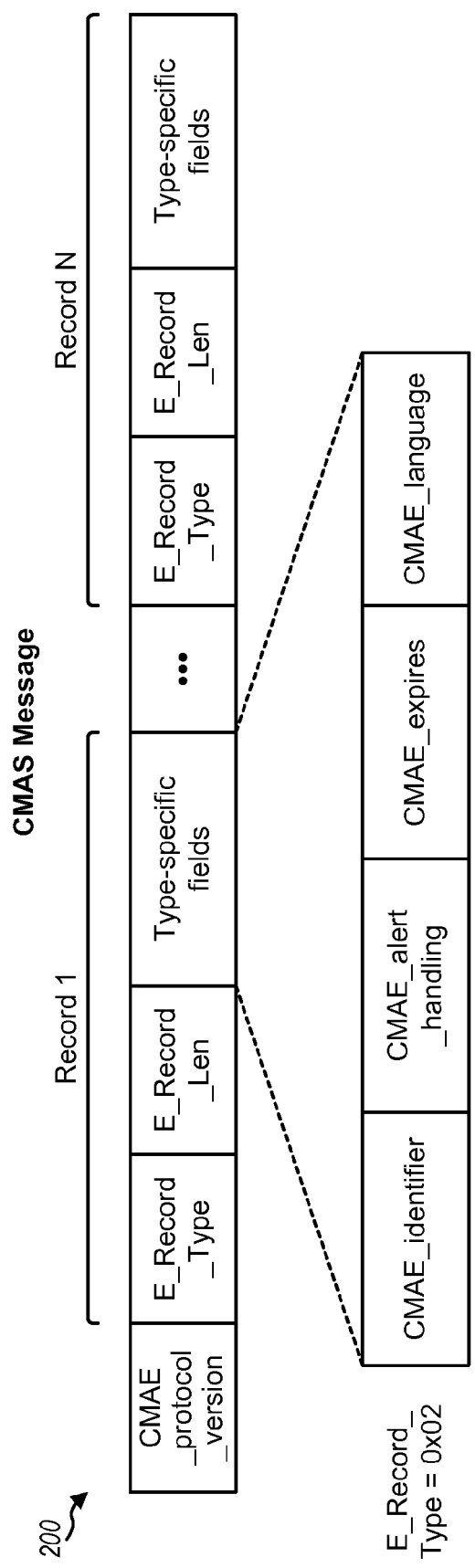
FIG. 2 shows a CMAS message.

FIG. 2 shows an exemplary format of a CMAS message, which may be used for an emergency alert. The CMAS message includes a CMAE_protocol_version field followed by N records, where N≥1. CMAE refers to the interface between MSC 130 and wireless device 110 for CMAS. Each record includes an E_Record_Type field indicating the type of the record, an E_Record_Len field indicating the length of the record, and Type-specific fields carrying information for the record. Different Type-specific fields may be included in records of different types.

The Type-specific fields for a record with the E_Record_Type field set to 0x00, where "0x" denotes a hexadecimal, are listed in Table 1.

TABLE 1

Type-specific fields for CMAS Message with E_Record_Type = 0x00

| Element | Length | Description |
| --- | --- | --- |
| CMAE_char_set | 5 bits | Identify character set for the alert text. |
| CMAE_alert_text | variable | Contain alert text in the language and character set specified in the CMAE_language and CMAE_char_set fields. |
| Reserved | 0-7 bits | Include padding bits to make the record byte-aligned. |

The Type-specific fields for a record with the E_Record_Type field set to 0x01 are listed in Table 2.

TABLE 2

Type-specific fields for CMAS Message with E_Record_Type = 0x01

| Element | Length | Description |
| --- | --- | --- |
| CMAE_category | 8 bits | Identify the category of the CMAS alert. |
| CMAE_response_type | 8 bits | Identify the response indicated for the CMAS alert. |
| CMAE_severity | 4 bits | Identify the severity of the CMAS alert. |
| CMAE_urgency | 4 bits | Identify the urgency of the CMAS alert. |
| CMAE_certainty | 4 bits | Identify the certainty of the CMAS alert. |
| Reserved | 0-7 bits | Include padding bits to make the record byte-aligned. |

The Type-specific fields for a record with the E_Record_Type field set to 0x02 are shown in FIG. 2 and listed in Table 3.

TABLE 3

Type-specific fields for CMAS Message with E_Record_Type = 0x02

| Element | Length | Description |
| --- | --- | --- |
| CMAE_identifier | 16 bits | Include a number uniquely identifying the CMAS message. |
| CMAE_alert_handling | 8 bits | Indicate whether the message requires special handling. |
| CMAE_expires | 48 bits | Indicate the expiration date and time of the CMAS alert, e.g., in yy/mm/dd/hh/mm/ss format. |
| CMAE_language | 8 bits | Indicate the language of the alert text in the CMAE_alert_text field. |

In general, a CMAS message may include any number of records, and each record may include any set of fields for any type of information. For clarity, much of the description below assumes the CMAS message definition given in Tables 1 to 3.

In an aspect, broadcast alert messages such as CMAS messages may be sent in SMS broadcast messages, which may be broadcast to wireless devices. The encapsulation of CMAS messages in SMS broadcast messages may be performed in different manners for different SMS implementations since each SMS implementation has different capabilities and utilizes different message types and formats. The encapsulation may also be performed in different manners for different broadcast alert messages, which may carry different information. For clarity, encapsulation of CMAS messages in SMS broadcast messages in CDMA SMS is described below.

Figure 3:
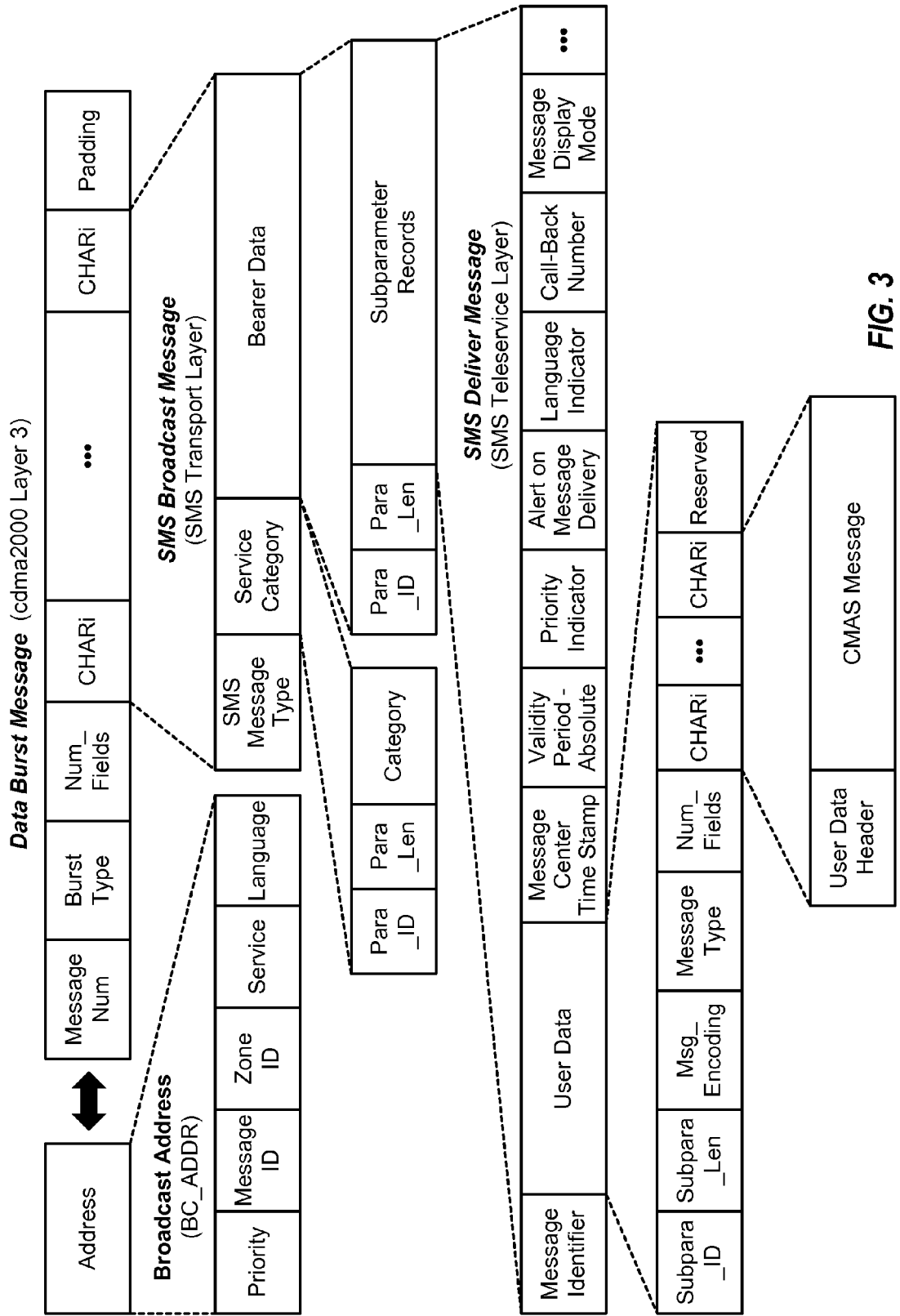
FIG. 3 shows an SMS Broadcast Message and a Data Burst Message.

FIG. 3 shows a design of sending a CMAS message in an SMS broadcast message in CDMA SMS. For CDMA SMS, the protocol stack includes the following four layers:

SMS Teleservice Layer—provides application-level data formats and procedures,

SMS Transport Layer—manages end-to-end delivery of SMS messages,

SMS Relay Layer—provides the interface between the Transport Layer and the Link Layer, and Link Layer—performs message transmission.

For CDMA SMS, data to be broadcast to wireless devices may first be encapsulated in an SMS Deliver Message, which is a message at the Teleservice Layer. The SMS Deliver Message includes various fields that describe attributes of the message and may further be encapsulated in an SMS Broadcast Message, which is a message at the Transport Layer. The SMS Broadcast Message includes various fields used for transport related functions and may further be encapsulated in a Data Burst Message, which is a message at Layer 3 for cdma2000. The Data Burst Message may be processed and broadcast to wireless devices.

The SMS Deliver Message includes a number of subparameters used to convey different types of information for the message. Table 4 lists a set of subparameters of the SMS Deliver Message when used to broadcast data. The SMS Deliver Message may also include other subparameters not listed in Table 4.

TABLE 4

SMS Deliver Message

| Subparameter | Description |
| --- | --- |
| Message Identifier | Provide message type and message identification. |
| User Data | Carry data for the message. |
| Message Center Time Stamp | Time when the message is (i) generated by the SMS message center or (ii) should be displayed at the wireless device. |
| Validity Period Absolute | Time during which the message should be displayed at the wireless device. |
| Priority Indicator | Indicate priority of the message, e.g., normal, interactive, urgent, or emergency. |
| Alert on Message Delivery | Indicate that the user should be alerted, e.g., by vibrating or audible sound. |
| Language Indicator | Indicate the language of the message. |
| Call-Back Number | Indicate a number to dial in reply to receiving the message. |
| Message Display Mode | Indicate when to display the message, e.g., immediately, based on a default setting, or when invoked by the user. |

Table 5 lists a set of fields in the Message Identifier subparameter of the SMS Deliver Message.

TABLE 5

Message Identifier Subparameter

| Field | Length | Description |
|---|---|---|
| Subparameter_ID | 8 bits | Set to '00000000' for the Message Identifier subparameter. |
| Subparam_Len | 8 bits | Set to '00000011' to indicate 3-byte length. |
| Message_Type | 4 bits | Set to type of the message. |
| Message_ID | 16 bits | Set to a message identifier value for the message. |
| Header_Ind | 1 bit | Set to '1' to indicate that the User Data subparameter includes a User Header Data (UHD) field. |

Table 6 lists a set of fields in the User Data subparameter of the SMS Deliver Message. The User Header Data field (if included) and the CMAS message may be sent in the CHARi fields of the User Data subparameter, as shown in FIG. 3.

TABLE 6

User Data Subparameter

| Field | Length | Description |
|---|---|---|
| Subparameter_ID | 8 bits | Set to '00000001' for the User Data subparameter. |
| Subparam_Len | 8 bits | Indicate the length of the User Data subparameter. |
| Msg_Encoding | 5 bits | Indicate the coding scheme used for the user data in the message. |
| Message_Type | 0 or 8 bits | Indicate the type of the message. |
| Num_Fields | 8 bits | Indicate number of occurrences of the CHARi field. |
| Num_Fields occurrences of the following field: | | |
| CHARi | variable | Carry one character of the user data. |
| The User Data subparameter ends with the following field: | | |
| Reserved | 0-7 bits | Include padding bits to make the User Data subparameter byte-aligned. |

The SMS Broadcast Message includes a number of parameters used to convey different types of information for the message. Table 7 lists a set of parameters of the SMS Broadcast Message. The SMS Broadcast Message may also include other parameters not listed in Table 7.

TABLE 7

SMS Broadcast Message

| Parameter | Description |
|---|---|
| SMS_Msg_Type | Set to '00000001' for the SMS Broadcast Message. |
| Service Category | Identify the type of service supported by the broadcast message. |
| Bearer Data | Carry data, e.g., the SMS Deliver Message. |

Table 8 lists a set of fields in the Service Category parameter of the SMS Broadcast Message. A range of category values (e.g., a range from 1000 to 2000) may be reserved for CMAS. In one design, different category values may be assigned to different alert categories or emergency events such as geologic warning (Geo), severe weather warning (Met), public safety warning (Safety), security warning (Security), rescue alert (Rescue), fire warning (Fire), health warning (Health), environmental warning (Env), transport alert (Transport), utility, telecommunication, and other non-transport infrastructure (Infra), chemical, biological, radiological, nuclear or high-yield explosive threat or attach (CBRNE), other events (Other), etc. In one design, different category values may be assigned to different alert handling such as no special handling, presidential alert, child abduction emergency, imminent life threatening, etc. In general, any set of category values may be defined for any type of CMAS information to be sent in the Service Category parameter.

TABLE 8

Service Category Parameter

| Field | Length | Description |
|---|---|---|
| Parameter_ID | 8 bits | Set to '00000001' for the Service Category parameter. |
| Param_Len | 8 bits | Set to '00000010' to indicate 2-byte length. |
| Category | 16 bits | Indicate service category of the SMS Broadcast Message. |

Table 9 lists a set of fields in the Bearer Data parameter of the SMS Broadcast Message. The Bearer Data parameter may include subparameter records that may carry subparameters of the SMS Deliver Message.

TABLE 9

Bearer Data Parameter

| Field | Length | Description |
|---|---|---|
| Parameter_ID | 8 bits | Set to '00001000' for the Bearer Data parameter. |
| Param_Len | 8 bits | Indicate the length of the Bearer Data parameter. |
| One or more occurrences of the following subparameter record: | | |
| Subparameter_ID | 8 bits | Indicate ID of a subparameter. |
| Subparam_Len | 8 bits | Indicate the length of the subparameter. |
| Subparameter Data | variable | Carry data for the subparameter. |

The SMS Broadcast Message may be associated with a broadcast address (BC_ADDR) that includes fields for various attributes of the message. Table 10 lists the fields of the BC_ADDR.

TABLE 10

BC_ADDR

| Parameter | Length | Description |
|---|---|---|
| Priority | 2 bits | Indicate priority of the broadcast message. |
| Message ID | 6 bits | Used to distinguish different messages for the same broadcast service transmitted within a time period. |
| Zone ID | 8 bits | Indicate a zone for which the message is to be sent. |
| Service | 16 bits | Indicate a service associated the message. |
| Language | 8 bits | Indicate a language used for the message. |

The Data Burst Message in cdma2000 may be used to send data for various applications and services. Table 11 lists some of the fields of the Data Burst Message that are pertinent for broadcast SMS. The Data Burst Message includes other fields not listed in Table 11 for simplicity.

TABLE 11

Data Burst Message

| Field | Length | Description |
|---|---|---|
| Message_Num | 8 bits | Indicate message number within a data burst stream. |
| Burst_Type | 6 bits | Indicate data burst type. |
| Num_Messages | 8 bits | Indicate number of messages in the data burst stream. |
| Num_Fields | 8 bits | Indicate number of occurrences of the CHARi field. |
| Num_Fields occurrences of the following field: | | |
| CHARi | 8 bits | Carry one 8-bit character of data. |

The Data Burst Message is a Layer 3 message that may be encapsulated in a Layer 2 message. The BC_ADDR may be included in a field of the Layer 2 message.

The SMS Deliver Message, the SMS Broadcast Message, and the BC_ADDR are described in 3GPP2 C.S0015-B, entitled "Short Message Service (SMS) for Wideband Spread Spectrum Systems." The Data Burst Message is described in 3GPP2 C.S0005-D, entitled "Upper Layer (Layer 3) Signaling Standard for cdma2000 Spread Spectrum Systems." These documents are publicly available.

As shown in FIG. 3, a CMAS message may be sent in the User Data subparameter of an SMS Deliver Message, which may be sent in the Bearer Data parameter of an SMS Broadcast Message, which may further be sent in the CHARi fields of a Data Burst Message. The fields of the CMAS message may be mapped to the fields of the SMS Deliver Message, the SMS Broadcast Message, and the Data Burst Message in various manners.

Table 12 shows a mapping of various fields of the CMAS message to fields of the CDMA and SMS messages, in accordance with one design.

TABLE 12

Mapping CMAS Message to CDMA & SMS Messages

| Fields | Description |
|---|---|
| BC_ADDR | |
| Priority | Set to "Emergency" for CMAS. |
| Message_ID | Provided by the wireless network. |
| Zone_ID | Provided by the wireless network. |
| Service | Set based on CMAE_category and/or CMAE_alert_handling. |
| Language | Set based on CMAE_language. |
| | SMS Broadcast Message parameters |
| SMS_Msg_Type | Set to '00000001' for the SMS Broadcast Message. |
| Service Category | |

TABLE 12-continued

Mapping CMAS Message to CDMA & SMS Messages

| Fields | Description |
|---|---|
| Category | Set based on CMAE_category and/or CMAE_alert_handling. |
| | SMS Deliver Message subparameters |
| Message Identifier | |
| Message_Type | Set to '0001' for deliver (mobile-terminated only). |
| Message_ID | Set based on CMAE_identifier. |
| Header_Ind | Set to '1' to indicate the User Header Data field being included in the User Data subparameter. |
| User Data | |
| Msg_Encoding | Set to an 8-bit octet for CMAS |
| CHARi | Carry all CMAE parameters, e.g., except for those already mapped to SMS parameters/subparameters. |
| Message Center Time Stamp | Set to when the CMAS message is received by the SMS message center. |
| Validity Period - Absolute | Set based on CMAE_expires. |
| Priority Indicator | Set to "Emergency" for CMAS. |
| Language Indicator | Set based on CMAE_language. |
| Alert on Message Delivery | Set by SMS message center or based on CMAE field. |
| Call-Back Number | Set based on CMAE field. |
| Message Display Mode | Set by SMS message center or based on CMAE field. |

Table 12 shows an exemplary mapping of a CMAS message to an SMS Broadcast Message sent in a Data Burst Message. The SMS Broadcast Message may carry an SMS Deliver Message, which may include all or a subset of the subparameters listed in Table 12. For example, the Alert on Message Delivery, the Call-Back Number, and the Message Display Mode subparameters may be optional and may or may not be included in the SMS Deliver Message. A CMAS message may also be mapped to an SMS Broadcast Message in other manners.

A CMAS message may also be sent in a GSM Cell Broadcast SMS (CBS) message in GSM-MAP. SMS message center 140 may generate a CBS message that may include up to 15 CBS pages. Each CBS page includes a fixed block of 88 octets and may be transmitted as a GSM CBS message over the air to wireless devices.

Figure 4:
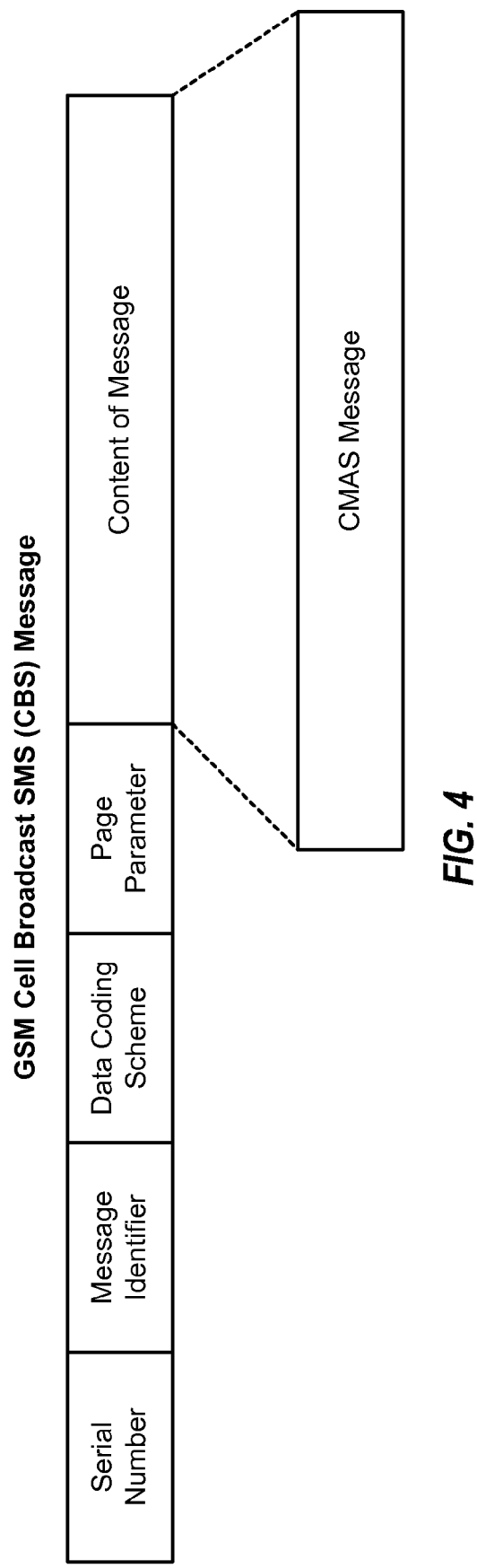
FIG. 4 shows a GSM Cell Broadcast SMS (CBS) message.

FIG. 4 shows a design of sending a CMAS message in a GSM CBS message in GSM SMS. The GSM CBS message includes five parameters, which are shown in FIG. 4 and described in Table 13. The GSM CBS message is described in ETSI TS 123 040, entitled "Technical realization of Short Message Service (SMS)," which is publicly available.

TABLE 13

GSM CBS Message

| Parameter | Length | Description |
|---|---|---|
| Serial Number | 2 bytes | Include the serial number and zone information for the GSM CBS message. |
| Message Identifier | 2 bytes | Identify the source and type (or service category) of the GSM CBS message. |
| Data Coding Scheme (DCS) | 1 bytes | Indicate the processing parameters for the GSM CBS message, e.g., the alphabet, coding, and language. |
| Page Parameter | 1 bytes | Indicate the number of CBS pages in the CBS message and the specific page within the GSM CBS message. |
| Content of Message | 82 bytes | Contain data for the GSM CBS message. |

Table 14 shows a mapping of various fields of a CMAS message to fields of a GSM CBS message, in accordance with one design. A CMAS message may also be mapped to a GSM CBS message in other manners.

TABLE 14

Mapping CMAS Message to GSM CBS Message

| Fields | Description |
|---|---|
| Message Identifier | Set based on CMAE_identifier, CMAE_category, etc. |
| Data Coding Scheme | Set based on CMAE_language, CMAE_char_set, etc. |
| Content of Message | Carry all CMAE parameters, e.g., except for those already mapped to GSM CBS fields. |

Referring back to FIG. 1, SMS message center 140 may receive a CMAS message from CMAS server 150 and may generate an SMS broadcast message carrying the CMAS message. The SMS broadcast message may be an SMS Broadcast Message in CDMA SMS or a GSM CBS message in GSM SMS. SMS message center 140 may set the various fields of the SMS broadcast message as described above. Base station 120 may receive the SMS broadcast message via MSC 130 and may generate a system broadcast message, which may be a Data Burst Message in cdma2000 or an equivalent message in GSM. Base station 120 may set various fields of the Data Burst Message as described above.

In one design, a URI link may be sent in an SMS broadcast message for a CMAS message. Wireless device 110 may receive the URI link and may prompt the user to go to a website to obtain additional information on an emergency alert. The user may launch a browser on wireless device 110 and may go to the website given by the URI link. The website may provide various types of multimedia such as pictures, text descriptions, audio clips, video clips, etc. regarding the emergency alert. The URI link may be sent in various manners. In one design, the Header_Ind field may be set to '1', and a User Header Data field containing the URI link may be included in the User Data subparameter, as shown in FIG. 3. In another design, a CMAS field may carry the URI link and may be included in the CMAS message.

In one design, broadcast reception information may be sent in an SMS broadcast message for a CMAS message. Wireless device 110 may receive the broadcast reception information and may prompt the user to receive a particular broadcast channel (e.g., a mobile television channel) to obtain additional information on an emergency alert. The user may launch a broadcast reception application on wireless device 110 to receive the broadcast channel. The broadcast channel may provide multimedia such as video, audio, text, etc., regarding the emergency alert. The broadcast reception information may be sent in various manners. In one design, the Header_Ind field may be set to '1', and a User Header Data field containing the broadcast reception information may be included in the User Data subparameter, as shown in FIG. 3. Table 15 lists a set of fields of the User Header Data field for the broadcast reception information, in accordance with one design. In another design, a CMAS field may carry the broadcast reception information and may be included in the CMAS message.

TABLE 15

Fields of User Header Data for Broadcast Reception Information

| Fields | Description |
|---|---|
| UDH Type | Set to a value assigned to broadcast reception information. |
| UDH Length | Indicate the length of the User Header Data field. |
| Technology | Indicate the radio technology (e.g., MediaFLO ™, DVB-H, ISDB-T, GSM, IS-2000, WCDMA, etc.) used for a broadcast channel. |
| Channel Number | Indicate the channel number to receive, e.g., formatted per broadcast technology. |

In one design, location information for an emergency event may be sent in a CMAS message for an emergency alert. The emergency event may be a hurricane, a fire, etc. Table 15 lists fields of a CMAE_event position_information record that may carry the location information, in accordance with one design. The second column of Table 15 indicates whether each field is mandatory (M) or optional (O).

TABLE 16

CMAE_event_position_information Fields

| Fields | | Description |
|---|---|---|
| Event Center | M | Set to latitude and longitude of the center of the event. |
| Impact Radius | O | Set to radius of the event. |
| Event Altitude | O | Set to altitude of the event. |
| Moving Direction | O | Set to direction in which the event is moving. |
| Moving Speed | O | Set to speed of the event. |

Wireless device 110 may receive the location information for the emergency event and may generate warning information for the user. Wireless device 110 may perform positioning to obtain a location estimate for wireless device 110. The location estimate may comprise the latitude and longitude of the current location of wireless device 110 and may further comprise altitude, moving direction, moving speed, etc. for wireless device 110. Wireless device 110 may compare its current location information with the event location information received from the CMAS message. Wireless device 110 may then generate warning information for the user. The warning information may inform the user of the distance between the user and the event center, whether the user is within the impact area of the event, whether the user is in the direction of the impact area, how soon the impact area will reach the user, the expect time in which the impact area will reach the user, whether the user should move away from the impact area, the direction in which the user should move to avoid the impact area, etc.

In one design, a callback number may be sent in an SMS broadcast message for a CMAS message. Wireless device 110 may receive the callback number and may prompt the user to make a voice call to the callback number to hear more information about the emergency alert. The callback number may also be an emergency number to use if the user needs to call an emergency number. The callback number may be sent in the Call-Back Number parameter, as shown in Table 12.

Other information (e.g., an email address) may also be sent in an SMS broadcast message for an emergency alert. The information may be presented by wireless device 110 to the user. The information may also invoke wireless device 110 to prompt the user to perform an action, to obtain additional information for the emergency alert, to take correction action, etc. The information may be sent in various manners in the CMAS message and/or may be mapped to the SMS broadcast message in various manners.

Wireless device 110 may receive a number of broadcast messages from a number of base stations for one or more emergency alerts. For example, base stations in different broadcast areas may transmit SMS broadcast messages from different SMS message centers for the same CMAS message for an emergency alert. Wireless device 110 may detect for duplicate broadcast messages and may discard duplicate messages. The SMS broadcast messages may have the same values for the Message_ID and the Message Center Time Stamp fields. The duplicate detection may be performed without relying on these fields.

In one design of duplicate detection, wireless device 110 may compute a hash digest over all or part of each broadcast message received by wireless device 110. A broadcast message may be an SMS broadcast message, a CMAS message, a system broadcast message, or some other broadcast message. A hash digest may also be referred to as a message digest, a hash, etc. For example, a hash digest may be generated based on (i) the portion of the CMAS message sent in the CHARi fields of the SMS Deliver Message or the entire CMAS message, (ii) the User Data subparameter or the entire SMS Deliver Message, (iii) the Bearer Data parameter or the entire SMS Broadcast Message, (iv) the CHARi fields or the entire Data Burst Message, or (v) all or some portion of any one or any combination of messages. The hash digest may be generated based on a cryptographic hash function such as SHA-1 (Secure Hash Algorithm), SHA-2 (which includes SHA-224, SHA-256, SHA-384 and SHA-512), MD-4 (Message Digest), MD-5, or some other secure hash algorithm known in the art. Alternatively, a non-secure hash (e.g., a cyclic redundancy check (CRC)) may also be used. Wireless device 110 may compare the generated hash digest against all stored hash digests (if any) for currently stored messages or previously received messages. Wireless device 110 may store the newly received message if the generated hash digest does not match any stored hash digest and may discard the newly received message otherwise.

The use of hash digests for duplicate detection may provide certain advantages. First, comparison between hash digests may be performed faster and using less memory than comparison between actual messages. Second, uniqueness of messages may be efficiently captured in hash digests of relatively small size. Third, small sized hashes for the broadcast messages can be stored in a random access memory (RAM) for faster access instead of a non-volatile (NV) memory or a Flash memory, which may have slower access speed.

FIG. 5 shows a design of a process 500 for delivering CMAS messages (or some other broadcast alert messages) via SMS messages. Process 500 may be performed by SMS message center 140 or some other network entity. A CMAS message for an emergency alert may be received (block 512). An SMS broadcast message carrying the CMAS message may be generated (block 514). The SMS broadcast message may comprise an SMS Broadcast Message in ANSI-41, a GSM CBS message in GSM-MAP, etc. The SMS broadcast message may be sent to a network entity for broadcasting to wireless devices (block 516).

In one design of block 514, at least one field of the CMAS message may be mapped to at least one field of the SMS broadcast message. For example, an identifier (e.g., CMAE_identifier) field of the CMAS message may be mapped to a message identifier (e.g., Message_ID) field of the SMS broadcast message, a category (e.g., CMAE_category) field or an alert handling (e.g., CMAE_alert handling) field of the CMAS message may be mapped to a category (e.g., Category) field of the SMS broadcast message, a language (e.g., CMAE_language) field of the CMAS message may be mapped to a language (e.g., Language Indicator) field of the SMS broadcast message, etc. The remaining fields of the CMAS message may be mapped to a data (e.g., Bearer Data) field of the SMS broadcast message.

In one design, the SMS broadcast message may include a URI link for a website providing information for the emergency alert. In another design, the SMS broadcast message may include broadcast reception information used by the wireless devices to receive a broadcast channel providing information for the emergency alert. The broadcast reception information may comprise the radio technology used to send the broadcast channel, a channel number of the broadcast channel, etc. In yet another design, the SMS broadcast message may include location information for an emergency event resulting in the emergency alert. The location information may comprise a coordinate (e.g., latitude and longitude) of the center of the emergency event, altitude of the emergency event, radius of the emergency event, direction of movement of the emergency event, speed of the emergency event, etc. The SMS broadcast message may also include other information.

FIG. 6 shows a design of a process 600 for delivering SMS messages carrying CMAS messages (or some other broadcast alert messages). Process 600 may be performed by base station 120 or some other network entity. An SMS broadcast message carrying a CMAS message for an emergency alert may be received (block 612). A system broadcast message carrying the SMS broadcast message may be generated (block 614). The system broadcast message may comprise a Data Burst Message in cdma2000 or some other message in other radio technology. The system broadcast message may be sent to wireless devices (block 616).

In one design of block 614, at least one field of the CMAS message may be mapped to at least one field of the system broadcast message. For example, the system broadcast message may comprise a data burst message having an associated a broadcast address (BC_ADDR). A category (e.g., CMAE_category) field or an alert handling (e.g., CMAE_alert handling) field of the CMAS message may be mapped to a service (e.g., Service) field of the broadcast address, a language (e.g., CMAE_language) field of the CMAS message may be mapped to a language (e.g., Language) field of the broadcast address, etc. The SMS broadcast message may be mapped to a data (e.g., CHARi) field of the system broadcast message. The fields of the CMAS message may also be mapped to the system broadcast message as described above.

FIG. 7 shows a design of a process 700 for receiving SMS messages carrying CMAS messages (or some other broadcast alert messages). Process 700 may be performed by wireless device 110 or some other entity. A system broadcast message carrying an SMS broadcast message, which may further carry a CMAS message for an emergency alert, may be received (block 712). At least one field of the CMAS message may be obtained from at least one field of a broadcast address for the system broadcast message (block 714). The SMS broadcast message may be obtained from a data field of the system broadcast message (block 716).

At least one field of the CMAS message may also be obtained from at least one field of the SMS broadcast message (block 718). For example, an identifier field of the CMAS message may be obtained from a message identifier field of the SMS broadcast message, a category field or an alert handling field of the CMAS message may be obtained from a category field of the SMS broadcast message, a language field of the CMAS message may be obtained from a language field of the SMS broadcast message, etc. Remaining fields of the CMAS message may be obtained from a data field of the SMS broadcast message (block 720).

In one design, a URI link may be obtained from the SMS broadcast message and may be used to access a website providing information for the emergency alert. In another design, broadcast reception information may be obtained from the SMS broadcast message and may be used to receive a broadcast channel providing information for the emergency alert. In yet another design, location information for an emergency event may be obtained from the SMS broadcast message. The location information may comprise a coordinate of the center of the emergency event, altitude of the emergency event, radius of the emergency event, direction of movement of the emergency event, speed of the emergency event, etc. The location of the wireless device may be determined. Warning information may then be generated based on the location of the wireless device and the location information for the emergency event. The warning information may include any of the information described above. Other information may also be obtained from the SMS broadcast message.

FIG. 8 shows a design of a process 800 for detecting for duplicate broadcast messages. Process 800 may be performed by wireless device 110 or some other entity. A broadcast message may be received from a wireless network (block 812). The broadcast message may be a broadcast alert message (e.g., a CMAS message) for an emergency alert, an SMS broadcast message, a system broadcast message, etc. A hash digest may be generated based on all or a portion of the received broadcast message (block 814). The generated hash digest may be compared against hash digests for stored broadcast messages (block 816). Whether to store or discard the received broadcast message may be determined based on the result of the comparison (block 818). The received broadcast message may be stored and/or displayed to the user if the generated hash digest does not match any of the hash digests for the stored broadcast messages or may be discarded otherwise.

Figure 9:
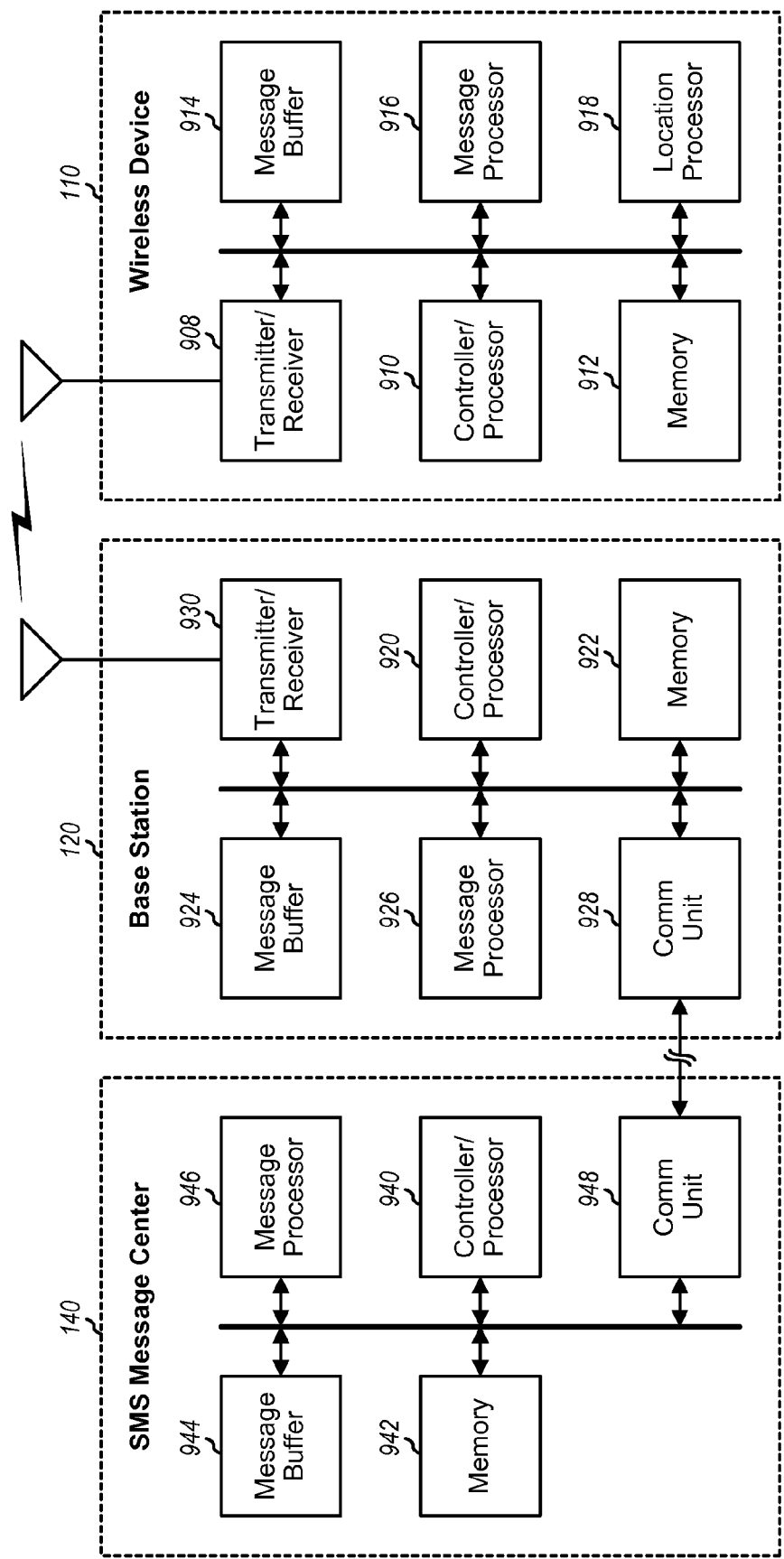
FIG. 9 shows a block diagram of the wireless device, the base station, and the SMS message center.

FIG. 9 shows a block diagram of a design of wireless device 110, base station 120, and SMS message center 140 in FIG. 1. Within SMS message center 140, a message buffer 944 may store CMAS messages received from CMAS server 150 and/or other broadcast alert messages received from other network entities. A message processor 946 may generate SMS broadcast messages for the CMAS messages and may perform mapping of CMAS messages to SMS broadcast messages, e.g., as described above. A controller/processor 940 may direct the operation at SMS message center 140. Processor 940 and/or 946 may perform or direct process 500 in FIG. 5 and/or other processes for the techniques described herein. A memory 942 may store data and program codes for SMS message center 140. A communication (Comm) unit 948 may support communication with other network entities.

Within base station 120, a message buffer 924 may store SMS broadcast messages and other messages to be sent by base station 120. A message processor 926 may generate system broadcast messages (e.g., data burst messages) for the SMS broadcast messages and may perform mapping from SMS broadcast messages to system broadcast messages, e.g., as described above. A controller/processor 920 may direct the operation at base station 120. Processor 920 and/or 926 may perform or direct process 600 in FIG. 6 and/or other processes for the techniques described herein. A memory 922 may store data and program codes for base station 120. A communication unit 928 may support communication with other network entities. A transmitter/receiver 930 may support radio communication with wireless devices.

Within wireless device 110, a message buffer 914 may store broadcast alert messages, SMS broadcast messages, and other messages received by wireless device 110. A message processor 916 may receive and process system broadcast messages, extract SMS broadcast messages sent in the system broadcast messages, and extract broadcast alert messages sent in the SMS broadcast messages. Processor 916 may perform mapping from system broadcast messages to SMS broadcast messages and further to broadcast alert messages, e.g., as described above. Processor 916 may also detect for duplicate broadcast messages. A location processor 918 may support positioning, compute location estimates for wireless device 110, process location information for emergency events, generate warning information based on the location of the wireless device and the location information for the emergency events, etc. A controller/processor 910 may direct the operation at wireless device 110. Processor 910, 916 and/or 918 may perform or direct process 700 in FIG. 7, process 800 in FIG. 8, and/or other processes for the techniques described herein. A memory 912 may store data and program codes for wireless device 110. A transmitter/receiver 908 may support radio communication with base stations.

FIG. 9 shows an exemplary design of SMS message center 140, base station 120, and wireless device 110. In general, each entity may include any number of controllers, processors, memories, buffers, transmitters, receivers, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for communication, comprising:
   receiving a Commercial Mobile Alert Service (CMAS) message for an emergency alert;
   generating a Short Message Service (SMS) teleservice layer delivery message that carries the CMAS message, and
   wherein a selected field of the delivery message indicates whether a user header data field associated with the CMAS message is included in the teleservice layer delivery message,
   wherein selected fields of the CMAS message are mapped to a language indicator field, a message delivery callback field, and a message display mode field of the delivery message,
   wherein a selected field of the delivery message is set to the time when the CMAS message is received by a SMS message center,
   wherein a selected field of the delivery message is set to the expiration date and time of the CMAS message, and
   wherein remaining fields of the CMAS message are carried in the user header data field of the delivery message; and
   sending the teleservice layer delivery message in an SMS broadcast message to a network entity for broadcasting to wireless devices.

2. The method of claim 1, wherein the generating the SMS teleservice layer delivery message comprises generating the user header data field to include a Uniform Resource Identifier (URI) link for a website providing information for the emergency alert.

3. The method of claim 1, wherein the generating the SMS teleservice layer delivery message comprises generating the user header data field to include broadcast reception information used by the wireless devices to receive a broadcast channel providing information for the emergency alert, the broadcast reception information comprising at least one of a radio technology used to send the broadcast channel and a channel number of the broadcast channel.

4. The method of claim 1, wherein the generating the SMS teleservice layer delivery message comprises generating the SMS teleservice layer delivery message to include location information for an emergency event resulting in the emergency alert, the location information comprising at least one of a coordinate of the emergency event, altitude of the emergency event, radius of the emergency event, direction of movement of the emergency event, and speed of the emergency event.

5. A method for communication, comprising:
   receiving a broadcast alert message for an emergency alert, the broadcast alert message comprising at least one of a link for a source providing information for the emergency alert, broadcast reception information, and location information for an emergency event resulting in the emergency alert;
   generating a Short Message Service (SMS) teleservice layer delivery message that carries the broadcast alert message, and wherein a selected field of the delivery message indicates that a user header data field carrying at least one of the link and the broadcast reception information is included in the teleservice layer delivery message,
   wherein selected fields of the CMAS message are mapped to a language indicator field, a message delivery callback field, and a message display mode field of the delivery message,
   wherein remaining fields of the CMAS message are carried in the user header data field of the delivery message;
   wherein selected fields of the CMAS message are mapped to a language indicator field, a message delivery callback field, and a message display mode field of the delivery message,
   wherein a selected field of the delivery message is set to the time when the CMAS message is received by a SMS message center,
   wherein a selected field of the delivery message is set to the expiration date and time of the CMAS message, and
   wherein remaining fields of the CMAS message are carried in the user header data field of the delivery message; and sending the SMS teleservice layer delivery message in a broadcast message to a network entity for broadcasting to wireless devices.

6. An apparatus for communication, comprising:
at least one processor configured to receive a Commercial Mobile Alert Service (CMAS) message for an emergency alert, to generate a Short Message Service (SMS) teleservice layer delivery message that carries the CMAS message, wherein a selected field of the delivery message indicates whether a user header data field associated with the CMAS message is included in the teleservice layer delivery message,
wherein selected fields of the CMAS message are mapped to a language indicator field, a message delivery callback field, and a message display mode field of the delivery message,
wherein a selected field of the delivery message is set to the time when the CMAS message is received by a SMS message center, and
wherein a selected field of the delivery message is set to the expiration date and time of the CMAS message, and
wherein remaining fields of the CMAS message are carried in the user header data field of the delivery message, and to send the teleservice layer delivery message in a SMS broadcast message to a network entity for broadcasting to wireless devices.

7. The apparatus of claim 6, wherein the at least one processor is configured to generate the user header data field to include a Uniform Resource Identifier (URI) link for a web site providing information for the emergency alert.

8. The apparatus of claim 6, wherein the at least one processor is configured to generate the user header data field to include broadcast reception information used by the wireless devices to receive a broadcast channel providing information for the emergency alert.

9. The apparatus of claim 6, wherein the at least one processor is configured to generate the SMS teleservice layer delivery message to include location information for an emergency event resulting in the emergency alert.

10. A method for communication, comprising:
receiving a Short Message Service (SMS) broadcast message that carries a teleservice layer delivery message that carries a Commercial Mobile Alert Service (CMAS) message, wherein a selected field of the teleservice layer delivery message indicates whether a user header data field associated with the CMAS message is included in the teleservice layer delivery message,
wherein selected fields of the CMAS message are mapped to a language indicator field, a message delivery callback field, and a message display mode field of the delivery message, and wherein remaining fields of the CMAS message are carried in the user header data field of the delivery message;
wherein a selected field of the delivery message is set to the time when the CMAS message is received by a SMS message center, and
wherein a selected field of the delivery message is set to the expiration date and time of the CMAS message, and
generating a system broadcast message carrying the SMS broadcast message; and
sending the system broadcast message to wireless devices.

11. The method of claim 10, wherein the generating the system broadcast message comprises
mapping at least one field of the CMAS message to at least one field of the system broadcast message, and
mapping the SMS broadcast message to a data field of the system broadcast message.

12. The method of claim 11, wherein the system broadcast message comprises a data burst message having an associated broadcast address, and wherein the mapping at least one field of the CMAS message to at least one field of the system broadcast message comprises mapping at least one of a category field of the CMAS message to a service field of the broadcast address, an alert handling field of the CMAS message to the service field of the broadcast address, and a language field of the CMAS message to a language field of the broadcast address.

13. An apparatus for communication, comprising:
at least one processor configured to receive a Short Message Service (SMS) broadcast message that carries a teleservice layer delivery message that carries a Commercial Mobile Alert Service (CMAS) message, and wherein a selected field of the teleservice layer delivery message indicates whether a user header data field associated with the CMAS message is included in the teleservice layer delivery message,
wherein selected fields of the CMAS message are mapped to a language indicator field, a message delivery callback field, and a message display mode field of the delivery message, and wherein remaining fields of the CMAS message are carried in the user header data field of the delivery message,
wherein a selected field of the delivery message is set to the time when the CMAS message is received by a SMS message center,
wherein a selected field of the delivery message is set to the expiration date and time of the CMAS message, to generate a system broadcast message carrying the SMS broadcast message, and to send the system broadcast message to wireless devices.

14. The apparatus of claim 13, wherein the at least one processor is configured to map at least one field of the CMAS message to at least one field of the system broadcast message, and to map the SMS broadcast message to a data field of the system broadcast message.

15. A method for operating a device in a communication system, comprising:
receiving a Short Message Service (SMS) broadcast message that carries a teleservice layer delivery message that carries a Commercial Mobile Alert Service (CMAS) message, and wherein a selected field of the teleservice layer delivery message indicates whether a user header data field associated with the CMAS message is included in the teleservice layer delivery message,
wherein selected fields of the CMAS message are mapped to a language indicator field, a message delivery callback field, and a message display mode field of the delivery message,
wherein remaining fields of the CMAS message are carried in the user header data field of the delivery message;
wherein a selected field of the delivery message is set to the time when the CMAS message is received by a SMS message center, and
wherein a selected field of the delivery message is set to the expiration date and time of the CMAS message; and
obtaining the CMAS message from a data field of the SMS broadcast message.

16. The method of claim 15, further comprising:
receiving a system broadcast message carrying the SMS broadcast message;
obtaining at least one field of the CMAS message from at least one field of a broadcast address associated with the system broadcast message; and obtaining the SMS broadcast message from a data field of the system broadcast message.

17. The method of claim 15, further comprising:
obtaining a Uniform Resource Identifier (URI) link from the user header data field, the URI link being for a website providing information for the emergency alert.

18. The method of claim 15, further comprising:
obtaining broadcast reception information from the user header data field, the broadcast reception information being used to receive a broadcast channel providing information for the emergency alert, the broadcast reception information comprising at least one of a radio technology used to send the broadcast channel and a channel number of the broadcast channel.

19. The method of claim 15, further comprising:
obtaining location information for an emergency event from the teleservice layer delivery message, the location information comprising at least one of a coordinate of the emergency event, altitude of the emergency event, radius of the emergency event, direction of movement of the emergency event, and speed of the emergency event.

20. The method of claim 19, further comprising:
determining a location of a wireless device; and
generating warning information based on the location of the wireless device and the location information for the emergency event.

21. An apparatus for communication, comprising:
at least one processor configured to receive a Short Message Service (SMS) broadcast message that carries a teleservice layer delivery message that carries a Commercial Mobile Alert Service (CMAS) message, and wherein a selected field of the teleservice layer delivery message indicates whether a user header data field associated with the CMAS message is included in the teleservice layer delivery message,
wherein selected fields of the CMAS message are mapped to a language indicator field, a message delivery call-back field, and a message display mode field of the delivery message,
wherein a selected field of the delivery message is set to the time when the CMAS message is received by a SMS message center,
wherein a selected field of the delivery message is set to the expiration date and time of the CMAS message, and
wherein remaining fields of the CMAS message are carried in the user header data field of the delivery message, to obtain the CMAS message from a data field of the SMS broadcast message.

22. The apparatus of claim 21, wherein the at least one processor is configured to receive a system broadcast message carrying the SMS broadcast message, to obtain at least one field of the CMAS message from at least one field of a broadcast address associated with the system broadcast message, and to obtain the SMS broadcast message from a data field of the system broadcast message.

23. The apparatus of claim 21, wherein the at least one processor is configured to obtain a Uniform Resource Identifier (URI) link from the user header data field, the URI link being for a website providing information for the emergency alert.

24. The apparatus of claim 21, wherein the at least one processor is configured to obtain broadcast reception information from the user header data field, the broadcast reception information being used to receive a broadcast channel providing information for the emergency alert.

25. The apparatus of claim 21, wherein the at least one processor is configured to obtain location information for an emergency event from the teleservice layer delivery message, the location information comprising at least one of a coordinate of the emergency event, altitude of the emergency event, radius of the emergency event, direction of movement of the emergency event, and speed of the emergency event.

26. An apparatus for communication, comprising:
means for receiving a Short Message Service (SMS) broadcast message that carries a teleservice layer delivery message that carries a Commercial Mobile Alert Service (CMAS) message,
wherein a selected field of the teleservice layer delivery message indicates whether a user header data field associated with the CMAS message is included in the teleservice layer delivery message,
wherein selected fields of the CMAS message are mapped to a language indicator field, a message delivery call-back field, and a message display mode field of the delivery message, and
wherein a selected field of the delivery message is set to the time when the CMAS message is received by a SMS message center,
wherein a selected field of the delivery message is set to the expiration date and time of the CMAS message, and
wherein remaining fields of the CMAS message are carried in the user header data field of the delivery message; and
means for obtaining the CMAS message from a data field of the SMS broadcast message.

27. The apparatus of claim 26, further comprising:
means for receiving a system broadcast message carrying the SMS broadcast message;
means for obtaining at least one field of the CMAS message from at least one field of a broadcast address for the system broadcast message; and
means for obtaining the SMS broadcast message from a data field of the system broadcast message.

28. The apparatus of claim 26, further comprising:
means for obtaining a Uniform Resource Identifier (URI) link from the user header data field, the URI link being for a website providing information for the emergency alert.

29. The apparatus of claim 26, further comprising:
means for obtaining broadcast reception information from the user header data field, the broadcast reception information being used to receive a broadcast channel providing information for the emergency alert.

30. The apparatus of claim 26, further comprising:
means for obtaining location information for an emergency event from the teleservice layer delivery message, the location information comprising at least one of a coordinate of the emergency event, altitude of the emergency event, radius of the emergency event, direction of movement of the emergency event, and speed of the emergency event.

31. A computer program product, comprising:
a non-transitory computer-readable medium comprising:
code for causing at least one computer to receive a Short Message Service (SMS) broadcast message that carries a teleservice layer delivery message that carries a Commercial Mobile Alert Service (CMAS) message,
wherein a selected field of the teleservice layer delivery message indicates whether a user header data field associated with the CMAS message is included in the teleservice layer delivery message,
wherein selected fields of the CMAS message are mapped to a language indicator field, a message delivery call-back field, and a message display mode field of the delivery message, and wherein remaining fields of the CMAS message are carried in the user header data field of the delivery message wherein a selected field of the delivery message is set to the time when the CMAS message is received by a SMS message center;

wherein a selected field of the delivery message is set to the expiration date and time of the CMAS message; and code for causing the at least one computer to obtain the CMAS message from a data field of the SMS broadcast message.

* * * * *